United States Patent
Widdowson et al.

(10) Patent No.: US 8,132,096 B1
(45) Date of Patent: *Mar. 6, 2012

(54) IMAGE COMPOSITION EVALUATION

(75) Inventors: Simon Widdowson, Palo Alto, CA (US); Eamonn O'Brien-Strain, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 754 days.

This patent is subject to a terminal disclaimer.

(21) Appl. No.: 11/728,654

(22) Filed: Mar. 26, 2007

(51) Int. Cl.
*G06F 17/00* (2006.01)
(52) U.S. Cl. ......... 715/243; 715/202; 715/255; 382/209
(58) Field of Classification Search .................. 715/202, 715/243, 716, 723, 255; 358/3.06, 3.01; 345/626; 382/209, 282
See application file for complete search history.

(56) References Cited

U.S. PATENT DOCUMENTS 5,893,095 A * 4/1999 Jain et al. ........................ 707/6
(Continued)

OTHER PUBLICATIONS http://web.archive.org/web/20030927045933/http://www.techappsnetwork.org/lib/multimed/file/lesnplan/9/187/Teacher+Resource.pdf, archived 2003, pp. 1-4.*

*Primary Examiner* — Thu Huynh

(57) ABSTRACT

In a method of evaluating compositional quality of a layout orientation of an image, image saliency data is received for an image to be presented in a viewing region. A layout orientation for presenting the image in the viewing region is received. A composition template embodying an image composition rule is received. The image saliency data and the composition template are utilized to determine a weighted occlusion cost for the layout orientation. The weighted occlusion cost is utilized to determine a composition score indicating quality of the layout orientation with respect to the image composition rule.

20 Claims, 13 Drawing Sheets

U.S. PATENT DOCUMENTS

| | | | |
|---|---|---|---|
| 6,606,117 B1 * | 8/2003 | Windle | 348/239 |
| 6,671,405 B1 * | 12/2003 | Savakis et al. | 382/203 |
| 6,721,733 B2 * | 4/2004 | Lipson et al. | 707/3 |
| 6,738,494 B1 * | 5/2004 | Savakis et al. | 382/100 |
| 6,748,097 B1 * | 6/2004 | Gindele et al. | 382/112 |
| 6,934,415 B2 * | 8/2005 | Stentiford | 382/205 |
| 7,035,477 B2 * | 4/2006 | Cheatle | 382/282 |
| 7,133,571 B2 * | 11/2006 | Cheatle | 382/282 |
| 7,171,058 B2 * | 1/2007 | Luo | 382/298 |
| 7,248,294 B2 * | 7/2007 | Slatter | 348/240.99 |
| 7,346,212 B2 * | 3/2008 | Cheatle | 382/173 |
| 7,477,800 B2 * | 1/2009 | Avidan et al. | 382/298 |
| 7,576,755 B2 * | 8/2009 | Sun et al. | 345/629 |
| 7,595,809 B2 * | 9/2009 | Widdowson | 345/629 |
| 7,620,267 B2 * | 11/2009 | Widdowson | 382/284 |
| 2002/0191860 A1 * | 12/2002 | Cheatle | 382/282 |
| 2002/0191861 A1 * | 12/2002 | Cheatle | 382/282 |
| 2004/0080670 A1 * | 4/2004 | Cheatle | 348/441 |
| 2005/0025387 A1 * | 2/2005 | Luo | 382/298 |
| 2005/0088542 A1 * | 4/2005 | Stavely et al. | 348/239 |
| 2006/0257048 A1 * | 11/2006 | Lin et al. | 382/276 |
| 2007/0253028 A1 * | 11/2007 | Widdowson | 358/1.18 |
| 2008/0025566 A1 * | 1/2008 | Widdowson et al. | 382/103 |
| 2008/0101761 A1 * | 5/2008 | Widdowson | 386/52 |
| 2008/0123993 A1 * | 5/2008 | Widdowson | 382/284 |
| 2008/0193048 A1 * | 8/2008 | Sun et al. | 382/284 |
| 2008/0219587 A1 * | 9/2008 | Avidan et al. | 382/276 |
| 2008/0235564 A1 * | 9/2008 | Erol et al. | 715/202 |

* cited by examiner

300

```
┌─────────────────────────────────────────────────────────────────┐
│ PRESENTING A VIEWING REGION TO A USER, WHEREIN THE VIEWING REGION│
│         IS PRESENTED TO THE USER IN A UNIFORM COLOR.            │
│                              310                                 │
└─────────────────────────────────────────────────────────────────┘
                                │
                                ▼
┌─────────────────────────────────────────────────────────────────┐
│  RECEIVING A USER DESIGNATION OF AN AREA OF VISUAL INTEREST IN THE│
│  VIEWING REGION, THE AREA OF VISUAL INTEREST REPRESENTING A USER │
│   SPECIFIED IMAGE COMPOSITION RULE REGARDING POSITIONING OF A   │
│      SALIENT IMAGE FEATURE WITH RESPECT TO THE VIEWING REGION.  │
│                              320                                 │
└─────────────────────────────────────────────────────────────────┘
                                │
                                ▼
┌─────────────────────────────────────────────────────────────────┐
│   GENERATING AN UPDATED VIEWING REGION FROM THE VIEWING REGION, │
│  THE UPDATED VIEWING REGION INDICATING THE AREA OF INTEREST WITH A│
│            COLOR OTHER THAN THE UNIFORM COLOR.                  │
│                              330                                 │
└─────────────────────────────────────────────────────────────────┘
                                │
                                ▼
┌─────────────────────────────────────────────────────────────────┐
│   SAVING THE UPDATED VIEWING REGION AS A COMPOSITION TEMPLATE   │
│        WHICH EMBODIES THE IMAGE COMPOSITION RULE.               │
│                              340                                 │
└─────────────────────────────────────────────────────────────────┘
```

RECEIVING IMAGE SALIENCY DATA FOR AN IMAGE TO BE PRESENTED IN A VIEWING REGION.
710

RECEIVING A LAYOUT ORIENTATION FOR PRESENTING THE IMAGE IN THE VIEWING REGION.
720

RECEIVING A COMPOSITION TEMPLATE EMBODYING AN IMAGE COMPOSITION RULE.
730

UTILIZING THE IMAGE SALIENCY DATA AND THE COMPOSITION TEMPLATE TO DETERMINE A WEIGHTED OCCLUSION COST FOR THE LAYOUT ORIENTATION.
740

UTILIZING THE WEIGHTED OCCLUSION COST TO DETERMINE A COMPOSITION SCORE INDICATING QUALITY OF THE LAYOUT ORIENTATION WITH RESPECT TO THE IMAGE COMPOSITION RULE.
750

RECEIVING IMAGE SALIENCY DATA FOR AN IMAGE TO BE DISPLAYED WITHIN A VIEWING REGION.
710

RECEIVING A COMPOSITION TEMPLATE EMBODYING AN IMAGE COMPOSITION RULE.
730

DETERMINING A PLURALITY OF LAYOUT ORIENTATIONS FOR PRESENTING THE IMAGE IN THE VIEWING REGION.
1035

UTILIZING THE IMAGE SALIENCY DATA AND THE COMPOSITION TEMPLATE TO DETERMINE A WEIGHTED OCCLUSION COST FOR A LAYOUT ORIENTATION OF SAID PLURALITY OF LAYOUT ORIENTATIONS.
1040

UTILIZING THE WEIGHTED OCCLUSION COST TO DETERMINE A COMPOSITION SCORE INDICATING QUALITY OF THE LAYOUT ORIENTATION WITH RESPECT TO THE IMAGE COMPOSITION RULE.
750

DETERMINING A SELECTED LAYOUT ORIENTATION FOR PRESENTING THE IMAGE WITHIN THE VIEWING REGION BY COMPARING COMPOSITION SCORES FOR A PLURALITY OF THE LAYOUT ORIENTATIONS.
1060

FIG. 10

IMAGE COMPOSITION EVALUATION

TECHNICAL FIELD

Embodiments of the present technology relate to image composition evaluation. More specifically, embodiments of the present technology relate to the use of occlusion costs to evaluate the quality of the composition of an image.

BACKGROUND

With the rapid rise in use of digital cameras and personal computers, the need to display digital images in an attractive manner is becoming increasingly prevalent. A slide show is one example of a means to display digital images and satisfy this need. A printed photograph is another example of a means to display digital images. Existing techniques for displaying digital images according to these and other methods typically assume that the viewable saliency in any portion of an image viewing region such as, for example, on a screen or in a printed photograph, is uniform. That is, the quantity of visible saliency is important, while the arrangement of the saliency in the viewing region is irrelevant.

A technique utilizing such an assumption about the uniform distribution of visible saliency will typically display of a salient portion of a digital image by tightly cropping around a salient feature and enlarging the salient feature to fill as much of a viewing region as possible. Such a technique is typically successful in cropping an image such that a large amount of image saliency is preserved and displayed within a viewing region. However, such a technique will rarely (except by happenstance) lead to the display of an image in a manner that is aesthetically pleasing according to an established rule of image composition or according to the aesthetic desires of a user. As such, users often find image layouts generated by existing automated image layout techniques to be bland or uninspiring.

A possible solution is to manually layout and/and or crop images to create more aesthetically pleasing results. However, such manual layout and cropping of digital images is both tedious and time consuming.

As the prevalence of digital images increase, so does the need for a solution to easily present these digital images in a pleasing manner. However, as described, existing techniques for laying out and/or cropping images are tedious and time consuming or only rarely deliver results which may be considered aesthetically pleasing according to an established rule of image composition or according to the aesthetic desires of a user.

BRIEF DESCRIPTION OF THE DRAWINGS

The accompanying drawings, which are incorporated in and form a part of this specification, illustrate embodiments of the present technology for image composition evaluation and, together with the description, serve to explain principles discussed below:

FIG. 3 is a flow diagram of an example method for capturing an image composition rule in a composition template, according to one embodiment.

FIG. 7 is a flow diagram of an example method for evaluating compositional quality of a layout orientation of an image, according to one embodiment.

FIG. 10 is a flow diagram of an example method for determining a layout orientation for presenting an image within a viewing region, according to one embodiment.

Figure 1:
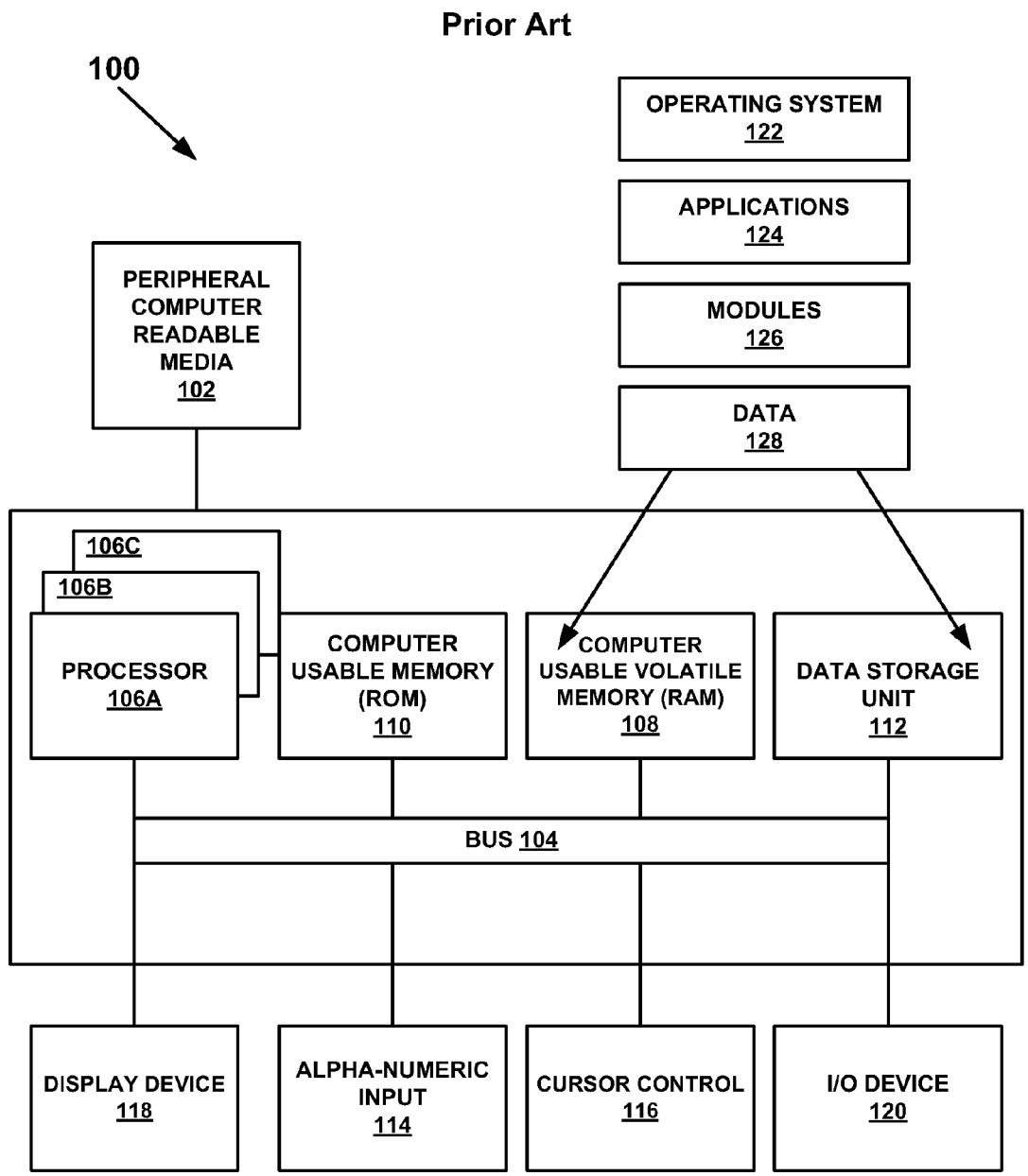
FIG. 1 is a diagram of an example computer system used in accordance with embodiments of the present technology.

The drawings referred to in this description should not be understood as being drawn to scale unless specifically noted.

DETAILED DESCRIPTION

Reference will now be made in detail to embodiments of the present technology for image composition evaluation, examples of which are illustrated in the accompanying drawings. While the present technology is described in conjunction with various embodiments, it will be understood that they are not intended to limit the present technology to these embodiments. On the contrary, the presented technology is intended to cover alternatives, modifications and equivalents, which may be included within the spirit and scope the various embodiments as defined by the appended claims. Furthermore, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present technology.

Unless specifically stated otherwise as apparent from the following discussions, it is appreciated that throughout the present detailed description, discussions utilizing terms such as "receiving", "utilizing", "determining", "cross-correlating", "cropping", "presenting", "comparing", "generating", "saving", or the like, refer to the actions and processes of a computer system (such as computer 100 of FIG. 1), or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology is also well suited to the use of other computer systems such as, for example, optical and virtual computers. Additionally, it should be understood that in embodiments of the present technology, one or more of the steps can be performed manually.

OVERVIEW OF DISCUSSION

Discussion will begin with a description of an example computer system environment with which, or upon which, embodiments of the present technology may operate. Discussion will proceed to a description of an example composition template generator which provides composition templates to a image composition evaluation system, and which facilitates user creation of composition templates. Components of the composition template generator will then be described. Operation of the composition template generator and its components will then be described in conjunction with description of an example method for capturing an image composition rule in a composition template.

Discussion will then proceed to a description of an example image composition evaluation system, which may be utilized to evaluate the composition of a layout orientation of an image (though referred to herein as a "layout orientation"), and in some embodiments to select a layout orientation judged to have the best composition quality from among a plurality of layout orientations of an image. Operation of the image composition evaluation system and its components will then be described in more detail in conjunction with a description of an example method for evaluating compositional quality of a layout orientation of an image, and also in conjunction with an example method for determining a layout orientation for presenting an image within a viewing region.

It is appreciated that the term "layout orientation," as used herein, refers to a geometric mapping from one or more images to a viewing region which the images are laid out or arranged within. Thus a layout orientation for an image may refer to an image (or data representative thereof) which has been the scaled, rotated, and/or cropped from its original appearance.

Example Computer System Environment

With reference now to FIG. 1, portions of the present technology are composed of computer-readable and computer-executable instructions that reside, for example, in computer-usable media of a computer system. That is, FIG. 1 illustrates one example of a type of computer that can be used to implement embodiments, which are discussed below, of the present technology. FIG. 1 illustrates an example computer system 100 used in accordance with embodiments of the present technology. It is appreciated that system 100 of FIG. 1 is an example only, and that the present technology can operate on or within a number of different computer systems including general purpose networked computer systems, embedded computer systems, optical computer systems, virtual computer systems, server devices, client devices, various intermediate devices/nodes, stand alone computer systems, digital cameras, multimedia consoles, multimedia handheld devices, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 may be a liquid crystal device, cathode ray tube, plasma display device or other display device suitable for creating, presenting, or displaying graphic images (such as digital images like photographs) and/or symbols or alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick, directional and input keys on a multimedia remote control, or special keys on alpha-numeric input device 114 capable of signaling movement of a given direction or manner of displacement. Alternatively, it will be appreciated that a cursor can be directed and/or activated via input from alphanumeric input device 114 using special keys and key sequence commands. System 100 is also well suited to having a cursor directed by other means such as, for example, voice commands.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology is stored, for example, as an application 124 or module 126 in memory locations within RAM 108, computer readable media within data storage unit 112, and/or peripheral computer readable media 102.

Composition Template Generator

Figure 2:
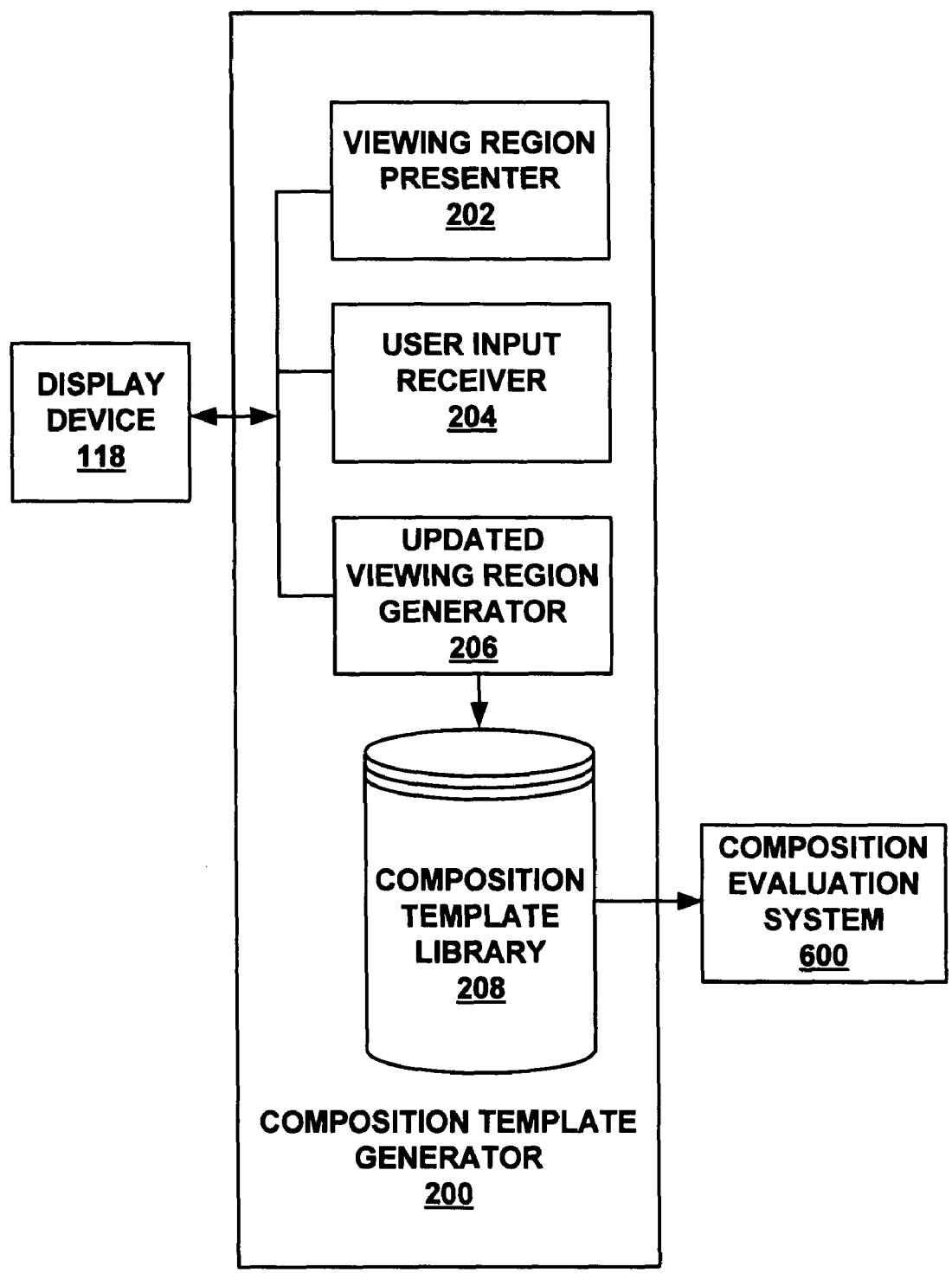
FIG. 2 is a block diagram of an example composition template generator, according to an embodiment.
Figure 6:
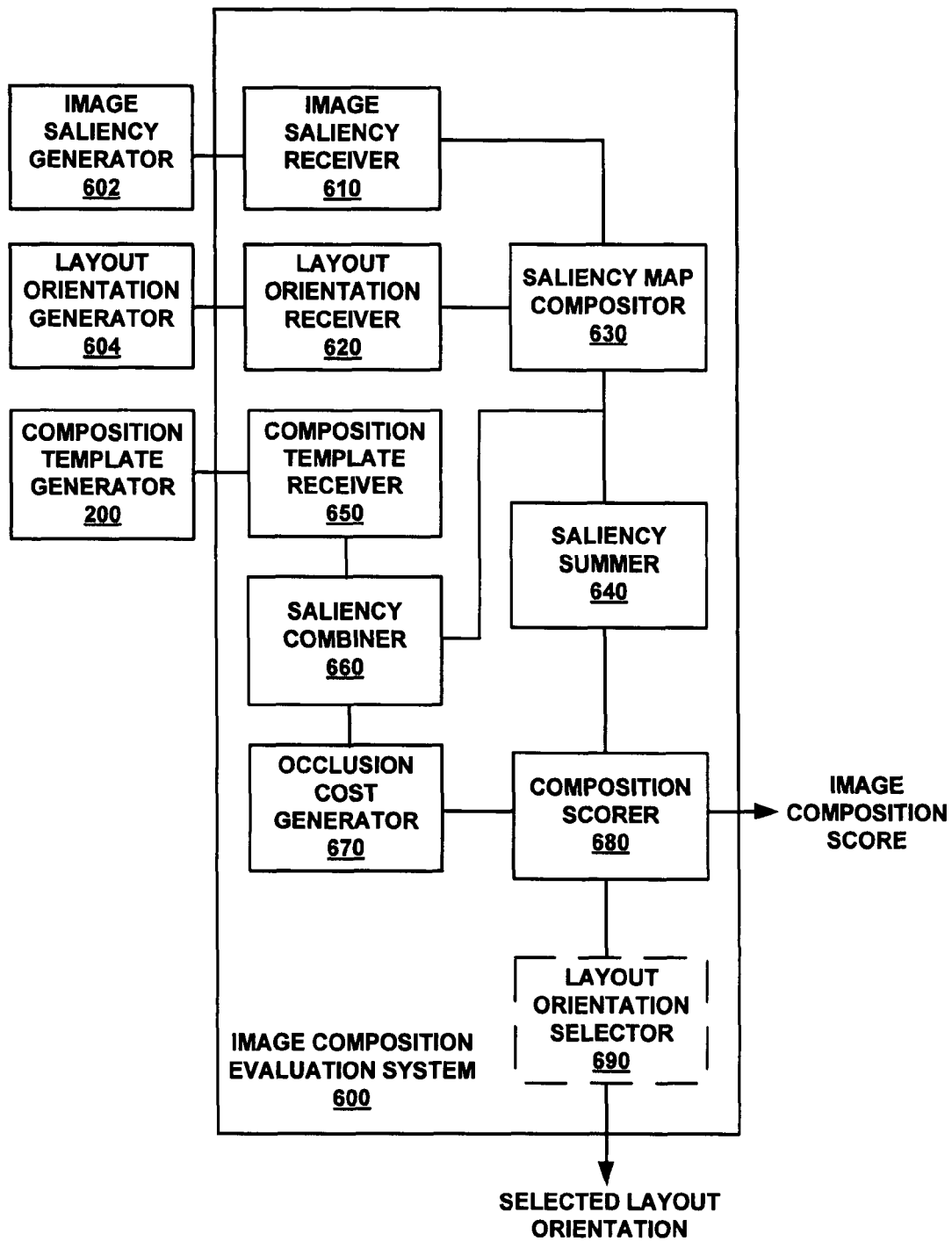
FIG. 6 is a block diagram of an example image composition evaluation system, according to an embodiment.

With reference now to FIG. 2, a block diagram is shown of one embodiment of a composition template generator 200 which provides composition templates to an image composition evaluation system 600 (FIG. 6). Composition template generator 200 may also facilitate user generation of one or more composition templates. As will be explained, the composition templates generated by and provided by composition template generator 200 embody one or more image composition rules (such as artistic image composition rules) against which the quality of a layout orientation of a digital image may be evaluated. The following discussion will begin with a description of the structure composition template generator 200. This discussion will then be followed with a description of example methods of operation of composition template generator 200.

Structure of an Example Composition Template Generator

Still referring to FIG. 2, composition template generator 200 is comprised of a viewing region presenter 202, a user input receiver 204, an updated viewing region generator 206, and a composition template library 208. As shown in the embodiment of FIG. 2, viewing region presenter 202, user input receiver 204, and updated viewing region generator 206 are coupled with a display device, such as display device 118 (for instance via computer system 100). Updated viewing region generator 206 is also coupled with composition template library 208. Composition template library 208 provides for storage of one or more composition templates and, as shown in FIG. 2, may be coupled to image composition evaluation system 600.

Viewing region presenter 202 outputs a uniformly colored viewing region to display device 118. The presented viewing region represents a blank image saliency map on which a user may indicate desired locations of image saliency in accordance with an artistic rule or some other arrangement of image saliency preferred by a user. In some embodiments, where composition templates are grayscale or binary templates, viewing region presenter 202 presents the uniformly colored viewing region in the color of black. It is appreciated that viewing region presenter 202 may present a viewing region in other uniform colors.

User input receiver 204 receives a user input of one or more desired locations of image saliency with respect to the presented viewing region. User input receiver 204 receives such a desired area of image saliency as a user input. In the user input, the user designates an area of visual interest (and in some embodiments a level of visual interest) with respect to a portion of the presented viewing region. For example, user input receiver 204 receives such a designation of an area of interest from cursor control device 116, or other similar pointing device or mechanism which will allow selection, designation, or manipulation of an area presented on display device 118. The user input may be comprised of coordinate information related to the designated area of interest, and may additionally be comprised of information which quantifies a user's level of interest (e.g., high, medium, low, or no interest) in the designated area.

Updated viewing region generator 206 generates an update to the presented viewing region in accordance with user inputs received by user input receiver 204. Updated viewing region generator 206 generates a viewing region which indicates the designated area(s) of interest in a color other than that of the uniform color of the viewing region. For example, in a case where a black and white binary composition template is being generated, updated viewing region generator 206 indicates the area(s) of interest in white if the uniform color of the viewing region is black. Similarly in an embodiment where a weighted grayscale composition template is being generated, the color white may be used to designate the highest level of interest, with lower levels of interest indicated by progressively darker shades of gray, and areas of no interest designated by the color of black. Updated viewing region generator 206 outputs this updated viewing region to display device 118 to provide visual feedback to the user in response to received user inputs. Additionally, when approved by the user, updated viewing region generator 206 outputs a copy of the updated viewing region to composition template library 208.

Composition template library 208 receives an updated viewing region from updated viewing region generator 206 and stores it as a composition template which embodies an image composition rule. Such a composition template may be stored in a digital image format. Additionally, in some embodiments, composition template library 208 also contains one or more predefined composition templates which embody image composition rules, such as, for example, a representation of an artistic rule of composition. The rule of thirds, discussed below, is one example of an artistic rule which may be embodied in some fashion as an image composition rule. It is appreciated that a composition template described herein may be scaled up and down in size as required. For example, composition template library 208 may output a composition template with a fixed set of dimensions or else scale a composition template to a requested size prior to providing the composition template as an output such as to composition evaluation system 600.

Example Method of Operation

The following discussion sets forth in detail the operation of present technology through description of an example embodiment. With reference to FIG. 3, flow diagram 300 illustrates example steps used by an embodiment of the present technology. Flow diagram 300 includes a process that, in various embodiments, is carried out by a processor under the control of computer-readable and computer-executable instructions. The computer-readable and computer-executable instructions reside, for example, in data storage features such as computer usable volatile memory 108, computer usable non-volatile memory 110, and/or data storage unit 112 of FIG. 1. The computer-readable and computer-executable instructions are used to control or operate in conjunction with, for example, processor 106A and/or processors 106A, 106B, and 106C of FIG. 1. Although specific steps are disclosed in flow diagram 300, such steps are examples. That is, embodiments are well suited to performing various other steps or variations of the steps recited in flow diagram 300. It is appreciated that the steps in flow diagram 300 may be performed in an order different than presented, and that not all of the steps in flow diagram 300 may be performed.

Example Method for Capturing an Image Composition Rule in a Composition Template FIG. 3 is a flow diagram 300 of a method for capturing an image composition rule in a composition template, in accordance with an embodiment of the present technology. Description of flow diagram 300 is facilitated by reference to elements shown in FIG. 2, FIG. 4, and FIGS. 5A, 5B, 5C, and 5D.

At 310 of flow diagram 300, in one embodiment, the method presents a viewing region to a user. The viewing region is presented to the user in a uniform color. In one embodiment, the viewing region is presented as an image in a uniform grayscale color, such as all black, all white, or all a uniform shade of gray. In one embodiment, viewing region presenter 202 presents the uniformly colored viewing region to the user as a viewable image displayed on a display device, such as display device 118.

Figure 4:
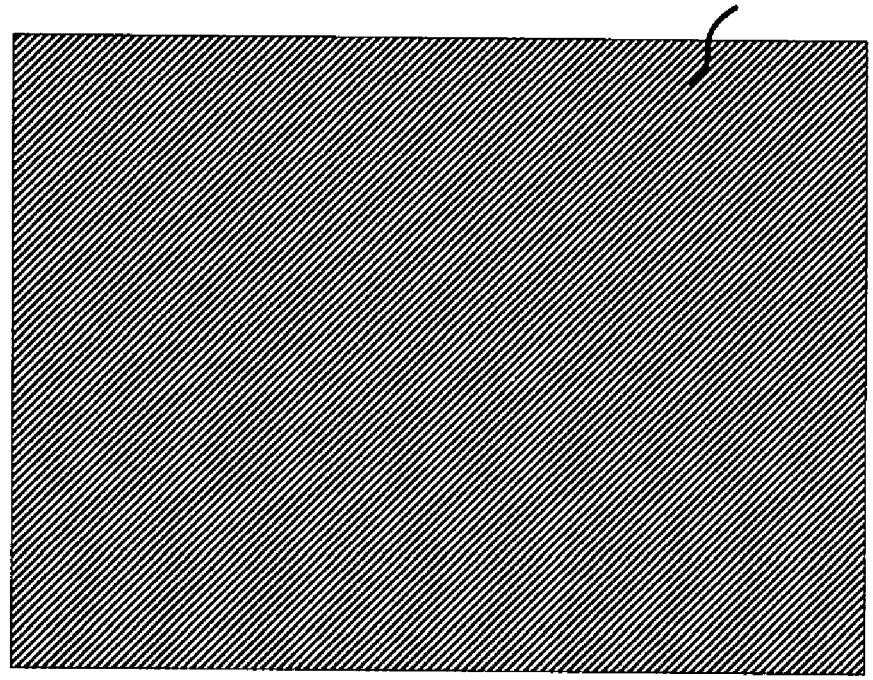
FIG. 4 represents an example of a uniformly colored viewing region, according to one embodiment.

FIG. 4 represents an example of a uniformly colored viewing region 400, according to one embodiment. Viewing region presenter 202 presents uniform viewing region 400 in uniform color 410. For purposes of example, and not of limitation, uniform color 410 is described herein as being the color black. Uniform color 410 represents a uniform distribution of zero salience at all locations of a saliency map represented by viewing region 400. This uniform distribution of zero salience presents a blank canvas upon which a user may mark desired areas where visible salience should be concentrated in digital images evaluated by a composition template.

At 320 of flow diagram 300, in one embodiment, the method receives a user designation of an area of visual interest in the viewing region. The area of visual interest represents a user specified image composition rule regarding positioning of a salient image feature with respect to the viewing region. In one embodiment, user input receiver 204 receives user inputs (for example from cursor control device 116) which indicate a user interest in an area of viewing region 400. The user may designate the area of interest for any reason, including compliance with an artistic rule of composition known by the user, or simply finding a particular area of a viewing region to be visually stimulating or pleasing. By designating an area of salience (interest), the user is creating a rule of composition for use in analyzing the composition quality of a digital image. The user may designate a single area of interest or a plurality of areas of interest with respect to viewing region 400. The one or more areas of interest are received by user input receiver 204. Similarly, user input receiver may receive a user designation of a level (or varying levels) of interest in a particular area or plurality of areas of viewing region 400.

At 330 of flow diagram 300, in one embodiment, the method generates an updated viewing region from the viewing region. The updated viewing region indicates the area (or areas) of interest with a color other than the uniform color. Updated viewing region generator 206 generates the updated viewing region based upon user inputs received by user input receiver 204. In one embodiment, where the initial viewing region has been presented in a uniform color 410 of black, updated viewing region generator 206 indicates designated areas of interest with the color white.

In one embodiment, where a user has designated varying levels of interest in one or more areas of viewing region 400, updated viewing region generator 206 uses a plurality of grayscale colors to indicate the plurality of areas of varying levels of visual interest. In such an embodiment, each level of the varying levels of visual interest is represented by a unique grayscale color, which is associated with a numerical value or weight (e.g., in the range of 0-255) that maps to a point of viewing region 400. For example, every area of highest interest may be represented by the color white (e.g., a numerical value of 255), while areas of lower interest are represented by successively darker shades of gray (e.g., numerical values greater than 0 but less than 255). Areas of no interest to the user remain colored black (e.g., a numerical value of 0), which in the examples described herein is the uniform color 410 of the initially presented viewing region 400. In this manner user inputs may be represented as a weighed saliency map. In one embodiment, updated viewing region generator 206 outputs the updated viewing region to a display device, such as display device 118, to provide visual feedback in response to user designation of one or more areas of interest.

Figure 5A:
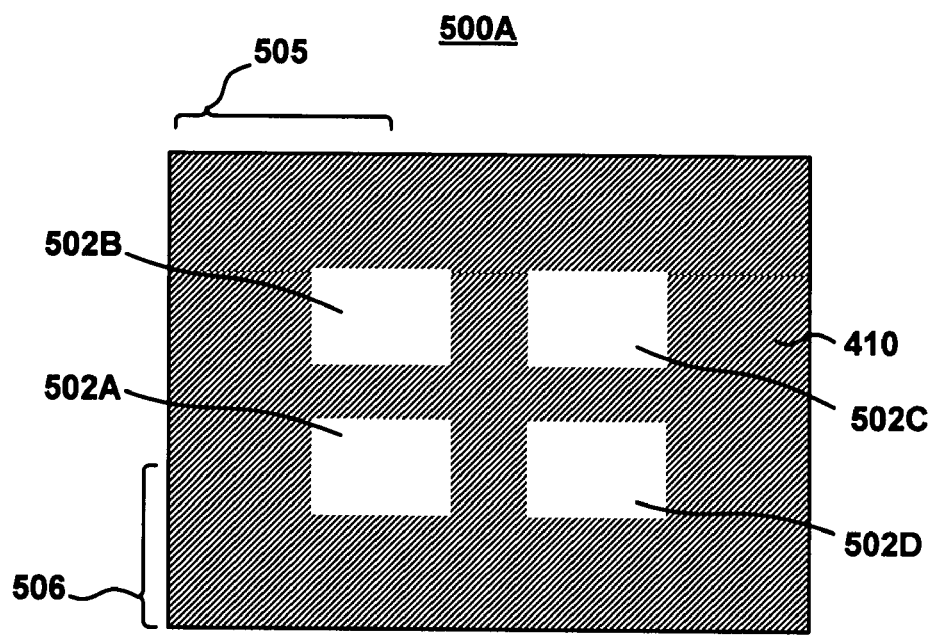
FIGS. 5A, 5B, 5C, and 5D represent some examples of composition templates, according to an embodiment.
Figure 5B:
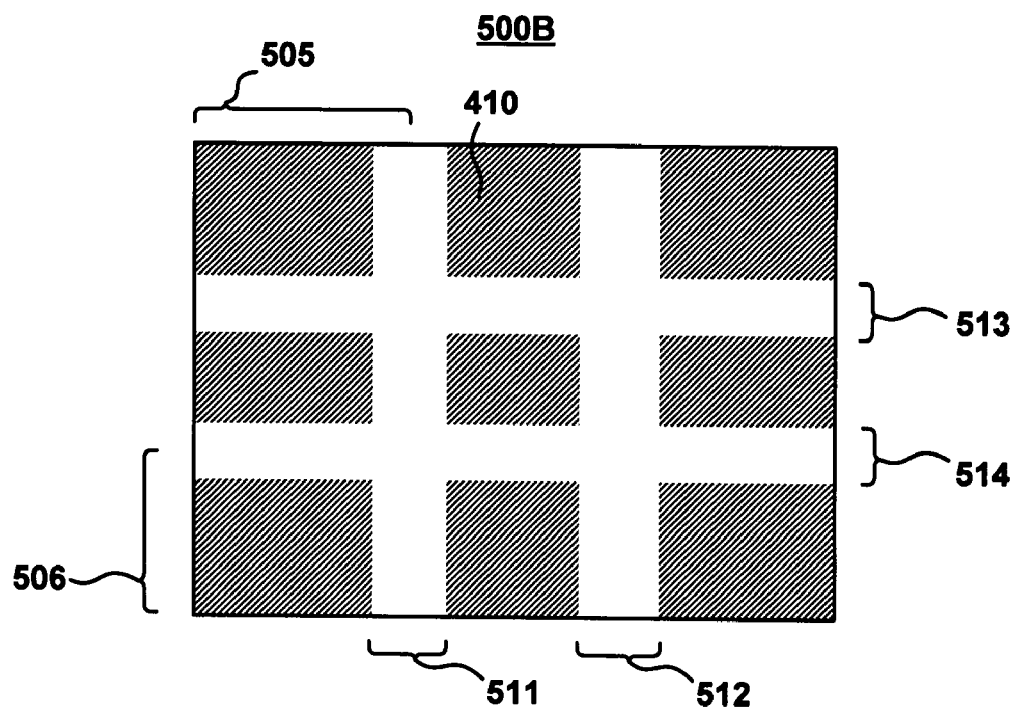
Figure 5C:
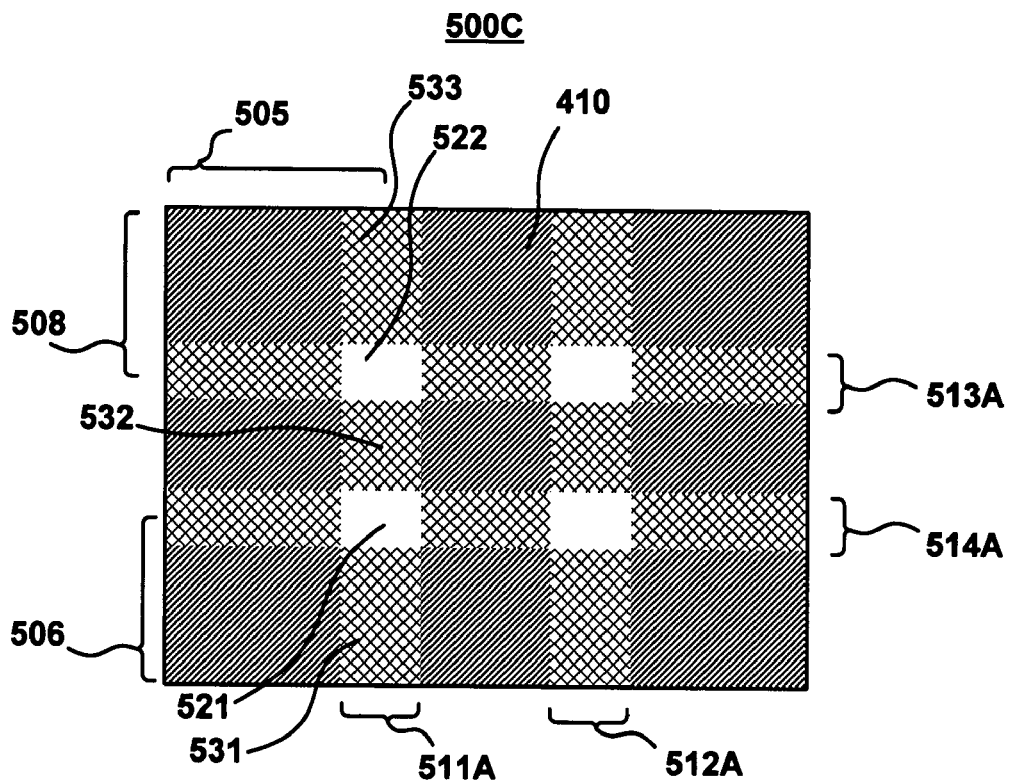
Figure 5D:
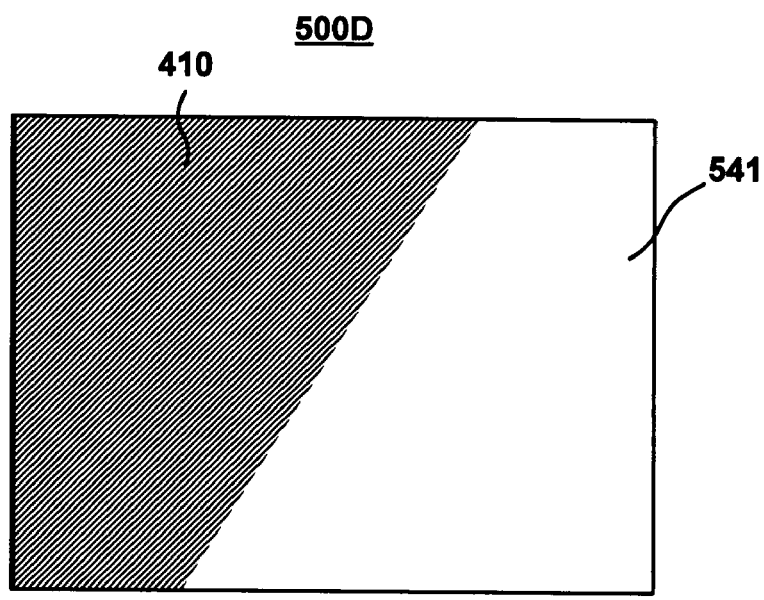

FIGS. 5A, 5B, 5C, and 5D represent some examples of composition templates, according to embodiment of the present technology. FIGS. 5A, 5B, 5C, and 5D represent examples of composition templates which may be predefined or user generated. FIGS. 5A, 5B, and 5C each present different visual embodiments of an artistic rule of composition colloquially known as "the rule of thirds." According to the rule of thirds, items of interest in an image are preferably located at nexus points or along lines that exist one third of the distance horizontally or vertically across from an edge of a viewing region. FIG. 5D represents a unique rule of composition, which simply designates a single area of high interest in a viewing region. FIGS. 5A, 5B, 5C, and 5D are presented by way of example and not of limitation, and it should be appreciated that a multitude of rules of composition may be similarly represented by predefined or user generated composition templates.

FIG. 5A represents an updated viewing region 500A in which four areas of interest 502A, 502B, 502C, and 502D have been designated as different colors from uniform color 410. For example, in one embodiment, areas of interest 502A, 502B, 502C, and 502D are represented in white when uniform color 410 is represented as black. Updated viewing region 500A represents one embodiment of the artistic rule of thirds. For example, area of interest 502A encompasses a portion of viewing region 500A which is one third of the way across viewing region 500A from the left edge (as represented by distance 505) and one third of the way up from the bottom edge of viewing region 500A (as represented by distance 506). Saving viewing region 500A as a composition template (for example in a digital image format), provides a desired saliency map which embodies one expression of the artistic rule of thirds as a composition rule. This desired saliency map is weighted to represent areas of higher saliency as a light color (such as white) and areas of lower saliency as a dark color (such as black).

FIG. 5B represents an updated viewing region 500B in which four areas of interest 511, 512, 513, and 514 have been designated as different colors from uniform color 410. For example, in one embodiment, areas of interest 511, 512, 513, and 514 are represented in white when uniform color 410 is represented as black. Updated viewing region 500B represents another embodiment of the artistic rule of thirds. For example, area of interest 511 encompasses a portion of viewing region 500B which is centered upon a line one third of the way across viewing region 500B from the left edge (as represented by distance 505). Likewise, area of interest 514 encompasses a portion of viewing region 500B which is centered upon a line one third of the way up from the bottom edge of viewing region 500B (as represented by distance 506). Saving viewing region 500B as a composition template (for example in a digital image format), provides a desired saliency map which embodies another expression of the artistic rule of thirds as a composition rule. This desired saliency map is weighted to represent areas of higher saliency as a light color (such as white) and areas of lower saliency as a dark color (such as black).

FIG. 5C represents an updated viewing region 500C in which four areas of interest 511A, 512A, 513A, and 514A have been designated. Different colors from uniform color 410 are used to designate areas of interest 511A, 512A, 513A, and 514A and to indicate variations in the levels of interest in different portions of these designated areas of interest. For example, area of interest 511A encompasses a portion of viewing region 500C which is centered upon a line one third of the way across viewing region 500C from the left edge (as represented by distance 505). Within area of interest 511A, sub-areas of medium interest (531, 532, and 533) are designated by a unique color (a unique shade of gray between white and black). Within area of interest 511A, sub-areas 521 and 522 (areas of high interest) are also designated by a unique color (white). Additionally, sub-area 521 encompasses a portion of viewing region 500C which is one third of the way across viewing region 500C from the left edge (as represented by distance 505) and one third of the way up from the bottom edge of viewing region 500C (as represented by distance 506). Similarly, sub-area 522 encompasses a portion of viewing region 500C which is one third of the way across viewing region 500C from the left edge (as represented by distance 505) and one third of the way down from the top edge of viewing region 500C (as represented by distance 508). Saving viewing region 500C as a composition template (for example in a digital image format), provides a desired saliency map which embodies one expression of the artistic rule of thirds as a composition rule. This desired saliency map is weighted to represent areas of higher saliency as a light color (such as white) areas of lower or no saliency as a dark color (such as black), and areas of medium saliency as a shade as an intermediate shade (between black and white).

FIG. 5D represents an updated viewing region 500D in which one area of interest 541 has been designated as different color from uniform color 410. For example, in one embodiment, area of interest 541 is represented in white when uniform color 410 is represented as black. Updated viewing region 500D represents, for example, an area of viewing region 500D in which a user desires visible salience of an image to reside. Saving viewing region 500D as a composition template (for example in a digital image format), provides a desired saliency map which embodies this user desire as a composition rule. As before, this desired saliency map is weighted to represent areas of higher saliency as a light color (such as white) and areas of lower saliency as a dark color (such as black).

Referring again to FIG. 3, at 330 of flow diagram 300, in one embodiment, the method continues to receive user designations of areas of interest and continues to generate updates to the viewing region in response to user inputs. When a user input to save the result is received, the viewing regions is updated a final time (if required), and the method proceeds to block 340 of flow diagram 300.

At 340 of flow diagram 300, in one embodiment, the method saves the updated viewing region as a composition template which embodies the image composition rule. In one embodiment, this comprises saving the composition template as a weighted saliency map for use in evaluating the compositional quality of a digital image. The saliency map is "weighted" in that the different colors in the saliency map (which reflect the colorations of the updated viewing region) represent valuations of designated levels of user interest. For instance, white may represent the highest user interest, successively darker shades of gray may represent successively lower levels of user interest, and black may represent zero user interest.

In one embodiment, at step 340, updated viewing region generator 206 outputs a copy of the updated viewing region to composition template library 208, where the updated viewing region is stored as a user generated composition template. For example, this can be done simultaneously with the outputting of an updated viewing region to display device 118, or upon user approval (such as by a user selecting a "save" function). By way of example, in one embodiment, updated viewing region generator 206 outputs updated viewing regions 500A, 500B, 500C, and 500D to composition template library 208, where they are saved as composition templates which can be output to or accessed by other systems, modules, or applications (such as, for example, image composition evaluation system 600).

Image Composition Evaluation System

With reference now to FIG. 6, a block diagram is shown of an image composition evaluation system 600 which determines a weighted occlusion cost for the layout of a digital image (referred to herein as an "image" or "images"). The following discussion will begin with a description of the structure system 600. This discussion will then be followed with a description of example methods of operation of system 600. It is appreciated that embodiments of system 600 described herein may operate on images which are scaled from their original and/or finished sizes. For example, system 600 may operate upon scaled-down versions of images to reduce computational requirements, reduce storage and memory requirements, and/or speed operation of composition evaluation system 600 as compared to operation on scaled-up versions of the same images.

Structure of an Example Image Composition Evaluation System

Still referring to FIG. 6, image composition evaluation system 600 is comprised of an image saliency receiver 610, a layout orientation receiver 620, a saliency map compositor 630, a saliency summer 640, a composition template receiver 650, a saliency combiner 660, an occlusion cost generator 670, a composition scorer 680, and an optional layout orientation selector 690. Image saliency receiver 610 and layout orientation receiver 620 are coupled to saliency map compositor 630 and with saliency summer 640. Saliency map compositor 630 is coupled with saliency combiner 660. Saliency combiner 660 is coupled with occlusion cost generator 670. Composition scorer 680 is coupled with occlusion cost generator 670, saliency summer 640, and with layout orientation selector 690 (when present).

In system 600, image saliency receiver 610 receives saliency data, such as a saliency map, for an image to be presented or displayed in a viewing region. A viewing region as described herein may comprise a region on a printable surface or an electronic or projected display. In one embodiment, this saliency information is received via a coupling to an image saliency generator 602. Image saliency generator 602 generates saliency data to designate areas which have been recognized by either automatic or manual designation as being interesting or important parts of the image. Image saliency receiver 610 supplies the image saliency data to saliency map compositor 630 as required.

Layout orientation receiver 620 receives at least one layout orientation for presenting the image in a viewing region. In one embodiment, a layout orientation is received via a coupling to a layout orientation generator 604, which provides one or more layout orientations for displaying an image within a viewing region. In some embodiments, where a plurality of layout orientations is received for an image, layout orientation generator 604 generates the plurality of layout orientations by altering the scale and or cropping the image to generate a variety of layout orientations. Layout orientation receiver 620 supplies the one or more layout orientations to saliency map compositor 630 as required.

Saliency map compositor 630 utilizes image saliency data for an image and a layout orientation for the image to determine a layout saliency distribution for the layout of the image. Saliency map compositor 630 can create a layout saliency distribution for a single layout orientation or can create individual layout saliency distributions for a plurality of layout orientations. The layout saliency distribution represents an image saliency map which is tailored to the scale and/or cropping of a particular layout orientation of the image. Saliency map compositor 630 provides one or more layout saliency distributions to saliency combiner 660 and saliency summer 640 as required. Though shown separately for purposes of clarity, it is appreciated that one or more of image saliency receiver 610 and layout orientation receiver 620 may be incorporated into saliency map compositor 630 in some embodiments.

Saliency summer 640 (when present) is utilized to calculate a sum of the visible saliency indicated in a layout saliency distribution. In one embodiment, this comprises summing values which represent the color of each pixel displayed. For example, in an eight-bit grayscale layout saliency distribution, each pixel will have an associated value in the range of 0-255 depending upon the grayscale color of the pixel. Saliency summer 640 provides a numerical value of the summed saliency to composition scorer 680 as required. Though shown separately for purposes of clarity, it is appreciated that in some embodiments saliency summer 640 may be incorporated into saliency map compositor 630 or another portion of image composition evaluation system 600. In one embodiment, saliency summer 640 receives information from saliency combiner 660. This information is utilized to determine which region of a layout saliency distribution upon which saliency summer 640 is to perform the saliency summation.

Composition template receiver 650 receives a composition template in the form of a weighted saliency map. In one embodiment, the composition template is scaled to the size of the layout saliency distribution of an image. The composition template embodies a rule of image composition that is utilized to evaluate the quality of the composition of the layout orientation which the layout saliency distribution represents. In some embodiments, the composition template is received from a composition template library, such as composite template library 208. In some embodiments, (as shown) the composition template is received from a composition template generator 200, which may be used to generate a customized composition template. It is appreciated that a received composition template may be predefined or user generated, and that a particular composition template may be received either randomly, according to an automated system, or according to a user selection. Composition template receiver 650 supplies composition templates to saliency combiner 660 as required. Though shown separately for purposes of clarity, it is appreciated that in some embodiments composition template receiver 650 may be incorporated into saliency combiner 660 or another portion of image composition evaluation system 600.

Saliency combiner 660 utilizes the composition template and the layout saliency distribution to determine a weighted saliency distribution of the layout orientation of the image within the viewing region. As will be seen, in one embodiment, saliency combiner 660 multiplies the saliency values for like pixel location in the composition template and the layout saliency distribution to determine a resultant weighted saliency distribution of the layout orientation. In such an embodiment, pixel values of a composition template may be normalized to fit on a scale that runs from zero to one. Such normalization maintains the pixel values of the weighted saliency distribution within the range of the pixel values of the layout saliency distribution (for example 0-255 if the layout saliency distribution is eight-bit grayscale). Saliency combiner 660 supplies the resulting weighted saliency distribution for an individual layout orientation to occlusion cost generator 670 as required.

In one embodiment, a plurality of layout orientations is generated by composition template receiver 650 acting in conjunction with saliency combiner 660. For instance, composition template receiver 650 scales a received composition template to one or more different sizes which are smaller than the dimensions of the layout saliency distribution. Saliency combiner 660 then positions a scaled composition template relative to a portion of the layout saliency distribution and crops the layout saliency distribution to the dimensions of portion "covered" by the scaled composition template. This positioning and cropping process is repeated at multiple locations to generate a plurality of layout orientations. In such an embodiment, saliency combiner 660 provides information to saliency summer 640 regarding the dimensions of a generated layout orientation so that saliency summer 640 may accurately generate a saliency summation representative of the portion of the layout saliency distribution that has been included in the generated layout orientation.

Occlusion cost generator 670 determines a weighted occlusion cost for the layout orientation from the weighted saliency distribution. The weighted occlusion cost provides a numerical representation of the amount of saliency from the image which is viewable within the viewing region as templated by its combination (via saliency combiner 660) with a received composition template. In one embodiment, the weighted occlusion cost is calculated by summing values of the pixels of the weighed saliency distribution. Such pixel summing is performed in a similar fashion to the manner described in conjunction with saliency summer 640. In some embodiments, the weighted occlusion cost for a layout or for each of a plurality of layouts is output by occlusion cost generator 670 for further use in image analysis. In some embodiments, occlusion cost generator 670 supplies the one or more weighted occlusion costs to composition scorer 680.

Composition scorer 680 calculates a composition score which evaluates the quality of the received layout orientation with respect to a composition rule embodied by the received composition template. In one embodiment, this composition score simply comprises a pass through of the weighted occlusion cost. In one embodiment, the composition score is calculated as a ratio of the weighted occlusion cost for a layout orientation to the numerical value of the summation of visible saliency in the layout saliency distribution of the layout orientation. In such an embodiment, the composition score may be expressed as a decimal value between zero and one. In this human-readable form, a composition score closer to one indicates higher quality of a layout orientation as compared to a composition template, while a composition score closer to zero indicates lower quality of a layout orientation as compared to a composition template. In one instance, such a numerical value is output from composition scorer 680 as an image composition score. In another instance, such as where a number of layout orientations for an image are being evaluated, composition scorer 680 provides the image composition score to layout orientation selector 690. It is appreciated that other numerical scales may be utilized to represent composition scores in a human-readable form. It is also appreciated that any human-readable image composition scores may be represented or approximated in a different form (e.g., binary) within a computer memory or processor.

Layout orientation selector 690 determines a highest scoring layout orientation of the image within the viewing region by comparing image composition scores for a plurality of layout orientations. The layout orientation with the highest score of those compared is then output as a selected layout orientation. In some embodiments, if required, layout orientation selector 690 crops an image according to the scale and dimensions of the highest scoring layout orientation.

Example Methods of Operation

The following discussion sets forth in detail the operation of present technology through description of example embodiments. With reference to FIGS. 7 and 10, flow diagrams 700 and 1000 each illustrate example steps used by various embodiments of the present technology. Flow diagrams 700 and 1000 include processes that, in various embodiments, are carried out by a processor under the control of computer-readable and computer-executable instructions. The computer-readable and computer-executable instructions reside, for example, in data storage features such as computer usable volatile memory 108, computer usable non-volatile memory 110, and/or data storage unit 112 of FIG. 1. The computer-readable and computer-executable instructions are used to control or operate in conjunction with, for example, processor 106A and/or processors 106A, 1066, and 106C of FIG. 1. Although specific steps are disclosed in flow diagrams 700 and 1000, such steps are examples. That is, embodiments are well suited to performing various other steps or variations of the steps recited in flow diagrams 700 and 1000. It is appreciated that the steps in flow diagrams 700 and 1000 may be performed in an order different than presented, and that not all of the steps in flow diagrams 700 and 1000 may be performed.

Example Method for Evaluating Compositional Quality of a Layout Orientation of an Image FIG. 7 is a flow diagram 700 of a method, for determining a weighted occlusion cost for presenting an image within a viewing region, in accordance with an embodiment of the present technology. Description of flow diagram 700 is facilitated by reference to elements shown in FIG. 5A, FIG. 5B, FIG. 5C, FIG. 5D, FIG. 6, FIG. 8, and FIG. 9.

At 710 of flow diagram 700, in one embodiment, the method receives image saliency data of an image to be presented in a viewing region. Image saliency receiver 610 is configured to receive image saliency data for an image to be presented in a viewing region. As shown in FIG. 6, such image saliency data may be received via a coupling to a source such as image saliency generator 602. Such saliency data is well known in the art, and techniques for recognizing objects and determining salient (or interesting) portions of images are known, and described in works such as, *A Model of Saliency-Based Visual Attention for Rapid Scene Analysis*, Laurent Itti, Christof Koch, and Ernst Niebur, IEEE Transactions on Pattern Analysis and Machine Intelligence, November 1998; and *Robust Real-Time Object Detection*, Paul Viola and Michael Jones, Second International Workshop on Statistical and Computational Theories of Vision—Modeling, Learning, Computing, and Sampling, Jul. 13, 3001.

Image saliency generator 602 generates image saliency data, which identifies important or interesting sections in images. Image saliency data for an image comprises information such as saliency maps, facial recognition information, object recognition information, and other image analysis information. Image saliency generator 602 generates saliency data based on well-known and established image processing techniques, such as techniques for determining saliency and recognizing objects such as faces. In some embodiments, image saliency generator 602 also generates the image saliency information based on user-specified parameters received from an optional user input. Image saliency generator 602 then passes saliency data for each image to image saliency receiver 610 in a form such as a ranking or mapping of salient areas of an image (or images if multiple images are being concurrently presented).

For instance, in some embodiments, the image saliency data received by image saliency receiver 610 is represented as a grayscale map of the image, where the grayscale value of each pixel is the saliency score for that pixel. In other embodiments, each image has saliency data passed in the form of a map, which may contain scores indicating the relative saliency of each section of the map. If more than one image is being processed for layout, saliency data for each of the multiple images is generated and passed to image saliency receiver 610 as described.

Figure 8:
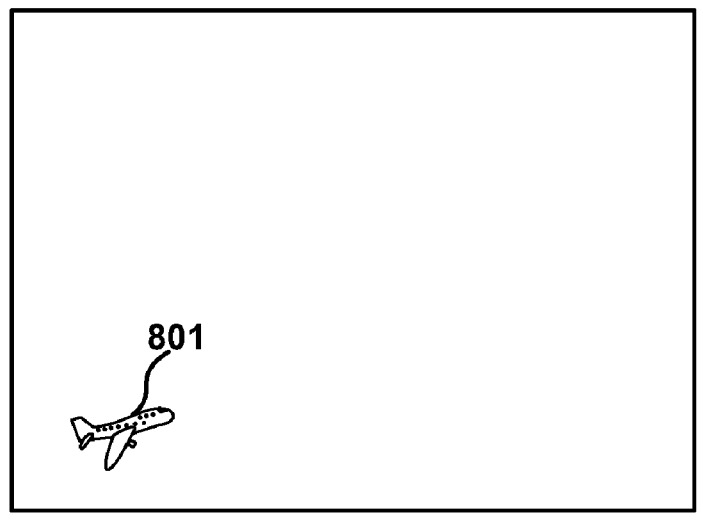
FIG. 8 represents a digital image utilized in the explanation of various embodiments.
Figure 9:
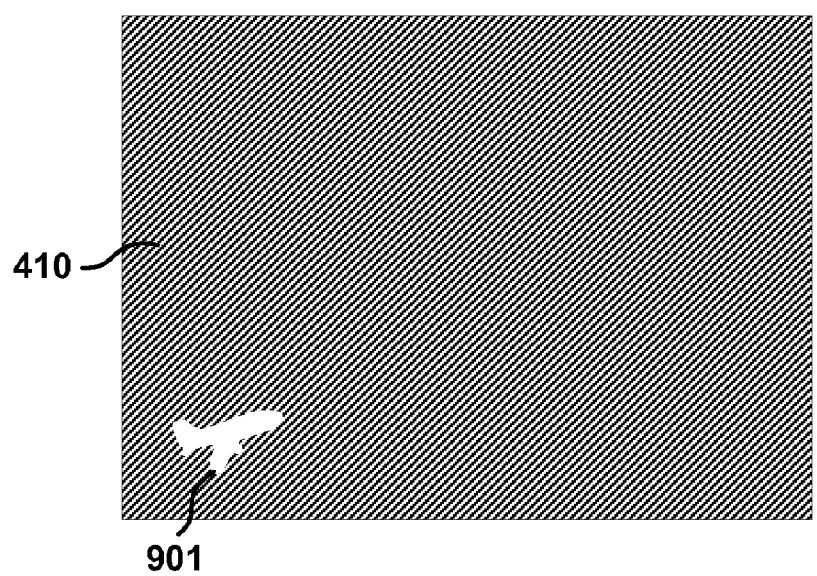
FIG. 9 is an example layout saliency distribution map for a layout of the digital image of FIG. 8, according to an embodiment.

FIG. 8 shows one example of a digital image 800, while FIG. 9 shows an example of a saliency map 900 of image 800 which is received, in one embodiment, by image saliency receiver 610. Saliency map 900 is an example of a grayscale representation of a saliency map where higher saliency portions of image 800, such as aircraft 801 are represented as lighter shades of grey, with the highest saliency regions being represented as white. In general, a saliency map is a mapping of points on an image (such as image 800) to numerical values which represent saliency levels associated with the mapped points. As such, a grayscale representation of a saliency map (as shown in FIG. 9) is merely one convenient way to display the numerical values which represent saliency levels.

Saliency map 900 represents lower saliency portions of image 400 as darker shades of gray, with the lowest saliency regions being represented as black. In saliency map 900, saliency of aircraft 801 is represented by region 901. For purposes of example, it may be assumed that the color of region 901 is white (representing high saliency). Saliency of other portions of image 800 are represented in saliency map by color 410, which may be assumed to be black (representing low saliency). Because only two colors (black and white) are utilized in saliency map 900, it represents a special form of a grayscale saliency map which is called a binary map. It is appreciated that a saliency map, such as saliency map 900, may be scaled up or down from the actual size of an image whose saliency is represented. Image saliency receiver 610 is coupled to saliency map compositor 630, and provides received image saliency data, such as saliency map 900, to saliency map compositor 630 as required.

At 720 of flow diagram 700, in one embodiment, the method receives a layout orientation for presenting the image in the viewing region. For example, layout orientation receiver 620 receives a layout orientation (and in some embodiments multiple layout orientations) for displaying an image, such as image 800, in a viewing region. Layout orientations are received via a coupling, for example, to layout orientation generator 604. In one embodiment, image 800 as shown in FIG. 8 is received as a layout orientation.

A plurality of different layout orientations may be received for any particular image. The plurality of layout orientations may be comprised of a variety of x-y orientations of the image relative to the viewing region and/or scalings (up or down) of the area of the image relative to the viewing region. Thus, layout orientations received by layout orientation receiver 620 contain information such as the size of the image or images being displayed and the location of the image or images within the viewing region, and in some embodiments, the relative priority of any overlapped images (which image is on top).

It is appreciated that layout orientation receiver 620 can also receive layout orientations in which one or more images have their respective image areas varied, or in which the viewing region area of the viewing region is varied. Layout orientation generator 604 generates image layouts utilizing well-known and established techniques for scaling, arranging, and/or overlapping an image or images within a viewing region. The layout orientation information is generated based on these techniques, pre-defined layout constraints, and in some embodiments, user-specified constraints supplied by an optional user input.

At 730 of flow diagram 700, in one embodiment, the method receives a composition template embodying an image composition rule. This can comprise receiving the composition template as a weighted saliency map, wherein a saliency value assigned to an area of the image, such as a pixel, is weighted in proportion to an importance of the visibility of that particular area. In one embodiment, this comprises receiving the weighted saliency map in the form of a grayscale map which designates areas of high visual interest in a viewing region, as expressed by an image composition rule that the composition template embodies. For example, this may comprise receiving a composition template in the form of a saliency map where an area (or areas) of the composition template is weighted to express an importance of visibility of the area (or areas) according to the composition rule embodied by the template. For example, in one embodiment areas of higher importance of visibility are represented as lighter shades and areas of lower importance of visibility are represented as darker shades. As shown in FIG. 6, composition template receiver 650 receives the composition template and provides it, as required, to saliency combiner 660. FIGS. 5A, 5B, 5C, and 5D provide some examples of composition templates that may be received, for example, from a composition template library 208 or a composition template generator 200.

At 740 of flow diagram 700, in one embodiment, the method utilizes the image saliency data and the composition template to determine a weighted occlusion cost for the received layout orientation. As is further described below, in embodiments where a plurality of layout orientations for presenting the image in the viewing region is received or determined, this can comprise utilizing the image saliency data and the composition template to determine a weighted occlusion cost for a plurality of the received/determined layout orientations.

In one embodiment, determining a weighed occlusion cost for the received layout orientation first comprises utilizing the received image saliency data for an image and a layout orientation for the image to determine a layout saliency distribution for the layout orientation. Saliency map compositor 630 utilizes the received image saliency data for an image and the layout orientation for the image to determine a layout saliency distribution for a particular layout orientation as displayed in a viewing region.

In a case where the layout of image 800 is presented as seen in FIG. 8, FIG. 9 represents an example layout saliency distribution map 900 for a layout of digital image 800 within a viewing region. In other embodiments, saliency map 900 will be scaled and/or cropped to the dimensions of a received layout orientation of image 800.

TABLE 1

Example Equation for Calculating Weighed Visible Saliency

The weighted visible saliency, $W_i$, of image "i", is given by:

$$W_i = \frac{\sum_{x,y} S_i(x, y) * V_i(x, y)}{\sum_{x,y} S_i(x, y)},$$

where $S_i$ is the saliency map for image i, and $V_i$ is the weighted visibility of the viewing region for image i.

In one embodiment, determining a weighted occlusion cost for the received layout orientation also comprises utilizing the composition template of the viewing region and the layout saliency distribution to determine a weighed saliency distribution of the layout orientation of the image within the viewing region, and then determining the weighted occlusion cost for the layout orientation from the weighted saliency distribution. Saliency combiner 660 combines the weighted saliency map of the viewing region (i.e., the composition template) with the layout saliency distribution of a particular layout orientation. As previously indicated, one means for performing this combining is to multiply saliency values of like-located pixels in the two saliency maps with another. The weighed visible saliency equation shown in Table 1 provides one example of how saliency combiner 660 combines a weighed saliency map of a viewing region with a layout saliency distribution of a layout orientation.

In one embodiment, saliency combiner 660 produces a weighted saliency distribution by combining (such as through multiplication) the like-located saliencies for the in-common areas shown in a composition template, such as, for example, composition template 500A and a layout saliency distribution.

Occlusion cost generator 670 receives the weighted saliency distribution from saliency combiner 660 and then calculates the weighted occlusion cost. The weighted occlusion cost is "weighted" because it is calculated from a saliency distribution of the image that is weighted to account for viewable saliency variation within the viewing region with respect the composition template. In some embodiments, this comprises calculating the weighted occlusion cost for presenting the image within a projected, displayed, or print media viewing region. One example of a print media viewing region is a printed photograph. In some embodiments, where a plurality of layout orientations are received/determined for evaluation by system 600, occlusion cost generator 670 calculates the weighted occlusion cost for a plurality of weighted saliency distributions which are generated from the plurality of received/determined layout orientations.

Occlusion cost generator 670 determines a quantitative occlusion cost associated with the relative position(s) of, and any potential overlapping between, the one or more images to be displayed in a viewing region. The cost equation shown in Table 2 provides one example of how occlusion cost generator 670 determines a weighted occlusion cost for an image or images in a layout.

The equation in Table 2 calculates the level of saliency for occluded regions in an image (or images) from a weighted viewable salience (W). The result is a weighted occlusion cost for having a region of an image covered or occluded in a layout orientation. The equation in Table 2 can be used to determine the weighted occlusion cost for a layout orientation of a single image to be displayed alone in a viewing region. It can also be modified to calculate the weighted occlusion cost for a layout of multiple images being displayed concurrently in a viewing region. The cost value (C) is generated in a range from zero to one and can be thought of as a percentage. A cost closer to one equals nearly total occlusion. A cost closer to zero indicates very little occlusion.

TABLE 2

Example Equation for Calculating Weighted Occlusion Cost of a Layout

The overall occlusion cost is given by:

$$C = \sum_i (1 - W_i)$$

It is appreciated that additional user-specified values can be added directly into occlusion cost generator 670 as non-linearities to be incorporated in the weighted occlusion cost determination, or can be added directly to the saliency data generated by image saliency generator 602. For instance, in one embodiment, if it is important that a certain face (or a specific image region) not be occluded, the face can be marked with high saliency in the image saliency data/map by setting a user-defined parameter. This ensures that in most cases if a face marked in such a manner is occluded, a high weighted occlusion cost (of one or close to one) will result from the weighted occlusion cost determination generated by occlusion cost generator 670. The weighted occlusion costs generated by occlusion cost generator 670 can be output in a variety of forms such as, for example, a list, a rank ordering, or a data stream of numerical values.

At 750 of flow diagram 700, in one embodiment, the method utilizes the weighted occlusion cost to determine a composition score indicating quality of the layout orientation with respect to the image composition rule. As previously described, in one embodiment, this comprises composition scorer 680 determining a ratio of the weighted occlusion cost to a summation of visible saliency in a layout saliency distribution of the layout orientation. In such an embodiment, saliency summer 640, or like functionality, provides the summation of visible saliency in the manner previously described.

Example Method for Determining a Layout Orientation For Presenting an Image within a Viewing Region FIG. 10 is a flow diagram 1000 of a method, for determining a layout orientation for presenting an image within a viewing region, in accordance with an embodiment of the present technology. Description of flow diagram 1000 is facilitated by reference to elements shown in FIG. 5A, FIG. 5D, FIG. 8, FIG. 9, FIGS. 11-15, and flow diagram 700 of FIG. 7.

At 710 of flow diagram 1000, in one embodiment, the method receives image saliency data of an image to be displayed in a viewing region. In one embodiment, this comprises receiving the image saliency data in the form of a grayscale map of the image, wherein different shades of gray are assigned to represent varying levels of saliency of areas and/or objects of the image. Reference is made to the description of step 710 of flow diagram 700, which is the same as step 710 of flow diagram 1000. In the interests of brevity and clarity step 710 will not be described again herein.

At 730 of flow diagram 1000, in one embodiment, the method receives a composition template embodying an image composition rule. The composition template may be received in the form of a weighted grayscale map, where different shades of grayscale color are assigned to represent different levels of visual interest. In such an embodiment, the grayscale map designates one or more areas of interest in a viewing region, as expressed by an image composition rule that the composition template embodies. In this manner, or a like manner, the composition template forms a saliency map where a saliency value (a grayscale color for instance) assigned to an area within the saliency map is weighted to express an importance of visibility of the area in accordance to the image composition rule embodied by the composition template. Reference is made to the description of step 730 of flow diagram 700, which is the same as step 730 of flow diagram 1000. In the interests of brevity and clarity step 730 will not be further described again herein.

At 1035 of flow diagram 1000, in one embodiment, the method determines a plurality of layout orientations for presenting the image in the viewing region. In one embodiment, this determining of a plurality of layout orientations comprises receiving a plurality of generated layout orientations. In such an embodiment, layout orientation receiver 620 receives the plurality of layout orientations for presenting the image in a viewing region from layout orientation generator 604 in the manner previously described in conjunction with step 720 of flow diagram 700.

In another embodiment, layout orientation receiver 620 receives a single layout orientation for presenting an image in a viewing region. For instance, this may be a layout orientation that is unscaled and uncropped. The layout saliency distribution for this layout orientation is then created by saliency map compositor in the manner previously described. The plurality of layout orientations is then generated by composition template receiver 650 in conjunction with saliency combiner 660. For instance, composition template receiver 650 scales a received composition template to one or more different sizes which are smaller than the dimensions of the layout saliency distribution. Saliency combiner 660 then positions a scaled composition template relative to a portion of the layout saliency distribution and crops the layout saliency distribution to the dimensions of portion "covered" by the scaled composition template. This positioning and cropping process is repeated at multiple locations (as illustrated by locations 1101, 1102, and 1103 of FIG. 11) to generate a plurality of layout orientations. In such an embodiment, saliency combiner 660 provides information to saliency summer 640 regarding the dimensions of a generated layout orientation so that saliency summer 640 may accurately generate a saliency summation representative of the portion of the layout saliency distribution included in the generated layout.

Figure 11:
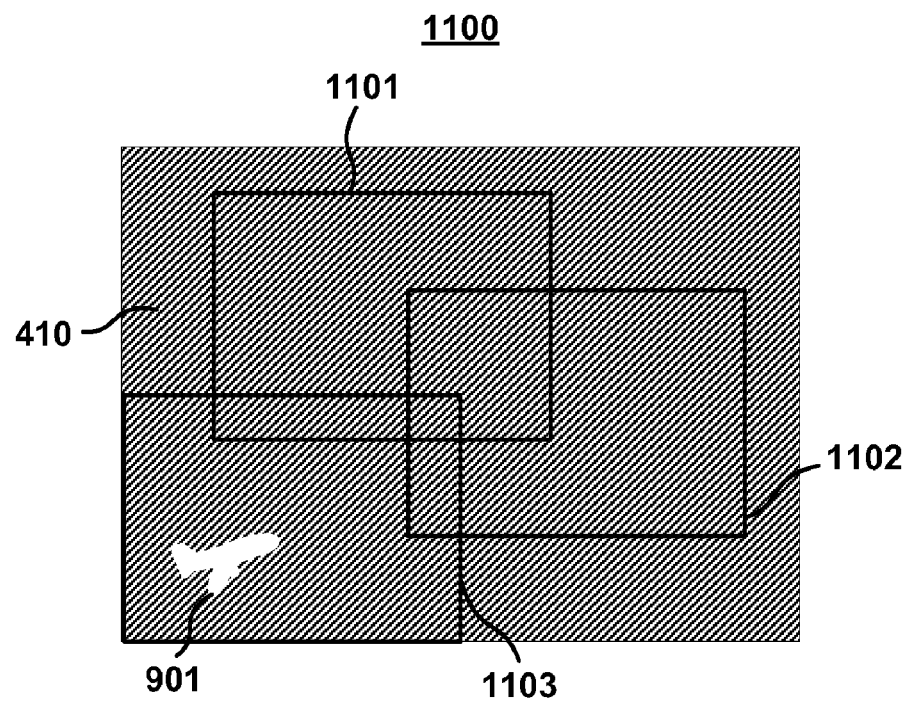
FIG. 11 is an example of a scaled composition template being positioned relative to a layout saliency distribution, according to one embodiment.

FIG. 11 is an example of a scaled composition template being positioned relative to a layout saliency distribution, according to one embodiment. FIG. 11 shows a layout saliency distribution 1100 for a layout orientation of the image 800 of aircraft 801. Region 901 represents the saliency attributed to aircraft 801 and, as previously described, is represented by the color white. The remaining portions of layout saliency distribution 1100 are represented by the color 410, which, as previously described, is black. In one embodiment, a composition template such as composition template 500A, for example, is scaled into a scaled composition template. In such an embodiment, locations 1101, 1102, and 1103 represent some examples of regions that the scaled composition template may be positioned relative to on layout saliency distribution 1100. Each of locations 1101, 1102, and 1103 represents a unique layout orientation which may determined by positioning a scaled composition template relative to a region of a layout saliency distribution and then cropping an overlaid portion from the layout saliency distribution.

At 1040 of flow diagram 1000, in one embodiment, the method utilizes the image saliency data and the composition template to determine a weighted occlusion cost for a layout orientation of the plurality of layout orientations. In one embodiment this is performed in the same fashion as was described in conjunction with step 740 of flow diagram 700. In another embodiment, saliency combiner 660 utilizes a scaled composition template to determine a weighted saliency distribution for a portion of a layout saliency distribution received from saliency map compositor 630. Occlusion cost generator 670 then determines a weighted occlusion cost for the weighted saliency distribution, for example, using calculations and techniques described in conjunction with step 740.

At 750 of flow diagram 1000, in one embodiment, the method utilizes the weighted occlusion cost to determine an image composition score indicating quality of the layout orientation with respect to the image composition rule embodied by the composition template. For example, an image composition score can be determined by composition scorer 680, in one embodiment, by determining a ratio of the weighted occlusion cost to a summation of visible saliency in the layout orientation. Reference is made to the description of step 750 of flow diagram 700, which is the same as step 750 of flow diagram 1000. In the interests of brevity and clarity step 750 will not be further described again herein.

At 1060 of flow diagram 1000, in one embodiment, the method determines a selected layout orientation for presenting the image within the viewing region by comparing composition scores for a plurality of the determined layout orientations. For example, in some embodiments, layout orientation selector 690 passively receives image composition score data for a plurality of layout orientations from composition scorer 680. Layout orientation selector 690 then chooses the highest image composition score from among the determined layout orientations which have been scored. This selected layout orientation is then output from layout orientation selector 690 for presentation, display, printing, or further processing. In some embodiments, this comprises cropping and/or scaling the image to match dimensions of the selected layout orientation. In one embodiment, if all evaluated image composition scores are unacceptably low, (for example in comparison to a predefined or user defined threshold) layout orientation selector 690 indicates this as an output.

In some embodiments, layout orientation selector 690 uses well known mathematical optimization techniques, such as steepest descent, to reduce calculations by homing in on the layout orientation that will have the highest composition score. In some such embodiments, layout orientation selector 690 communicates with occlusion cost generator 670 to steer it toward calculating weighted occlusion costs for certain layout orientations, thus saving time and reducing calculations. In some embodiments, the communication also encompasses communication with layout orientation generator 604 and/or saliency combiner 660 to actively steer layout orientation generation/determination to a layout orientation with the highest composition score. Such active steering reduces calculations, speeds layout orientation generation/determination, and speeds weighted occlusion cost generation by lowering the number of orientation layouts evaluated.

Figure 12:
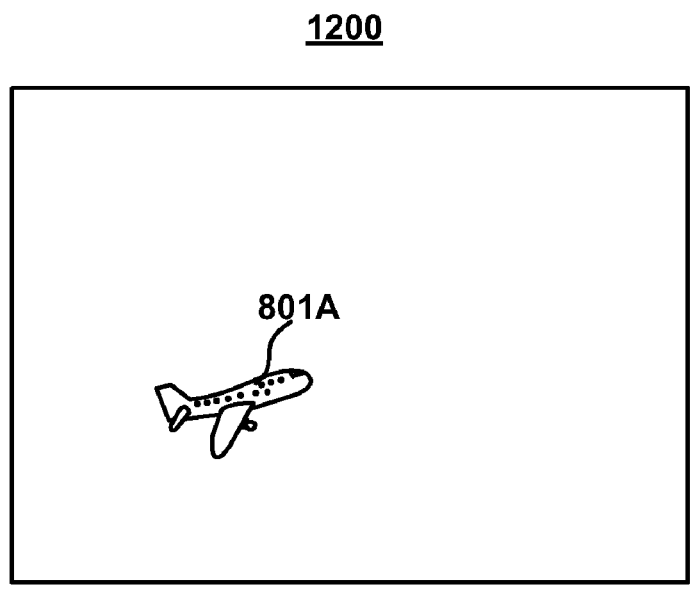
FIG. 12 is an example of a selected layout orientation for presenting the image of FIG. 8, according to one embodiment.

FIG. 12 is an example of a selected layout orientation 1200 for presenting image 800, according to one embodiment. For example, consider an embodiment of the method of flow diagram 1000 where composition template 500A (FIG. 5A) is used to evaluate image 800 and determine a selected layout orientation. A variety of layout orientations for image 800 are evaluated. The composition score for selected layout orientation 1200 will be very close to 1.0 (such as 0.90), which is very high on a scale running from zero to one. Layout orientation 1200 achieves this high image composition score due to aircraft 801A being positioned approximately within area of interest 502A of composition template 500A. In this fashion, selected layout orientation 1200 is selected because it complies with the rule of composition embodied within composition template 500A.

Figure 13:
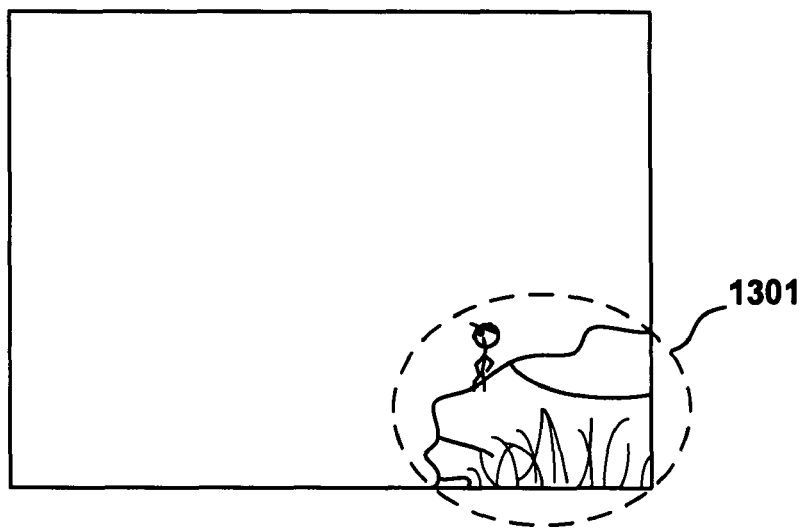
FIG. 13 is another example digital image utilized in the explanation of an embodiment.

FIG. 13 is another example digital image 1300 utilized in the explanation of an embodiment if the present technology. Region 1301 of FIG. 13 shows salient features which include a person standing on a rock. As can be seen, region 1301 is small and is located in the bottom right corner of image 1300.

Figure 14:
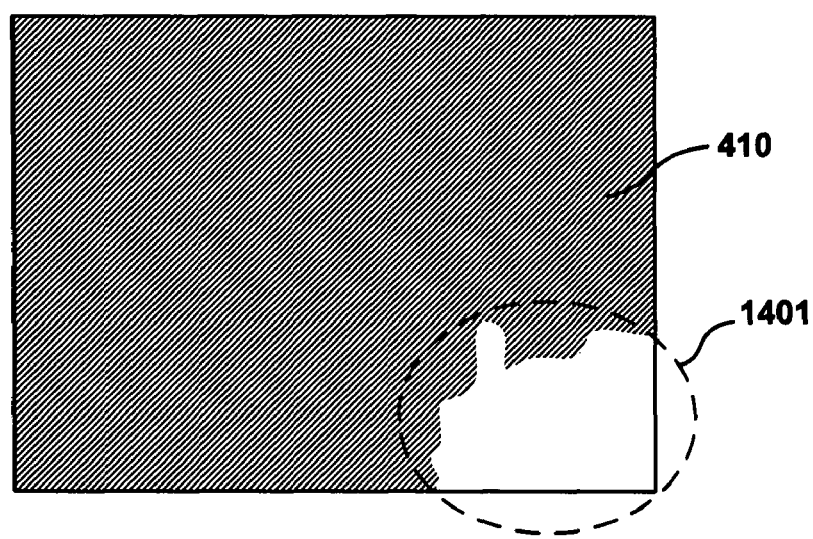
FIG. 14 is an example layout saliency distribution map for a layout of the digital image of FIG. 13, according to an embodiment.

FIG. 14 is an example layout saliency distribution map 1400 for a layout of the digital image of FIG. 13, according to an embodiment. In layout saliency distribution map 1400, region 1401 shows that the salient features of region 1301 (a person standing on a rock) are designated by a particular grayscale color (for example white), while all other regions are represented by the grayscale color 410 (which as described herein, is black).

Figure 15:
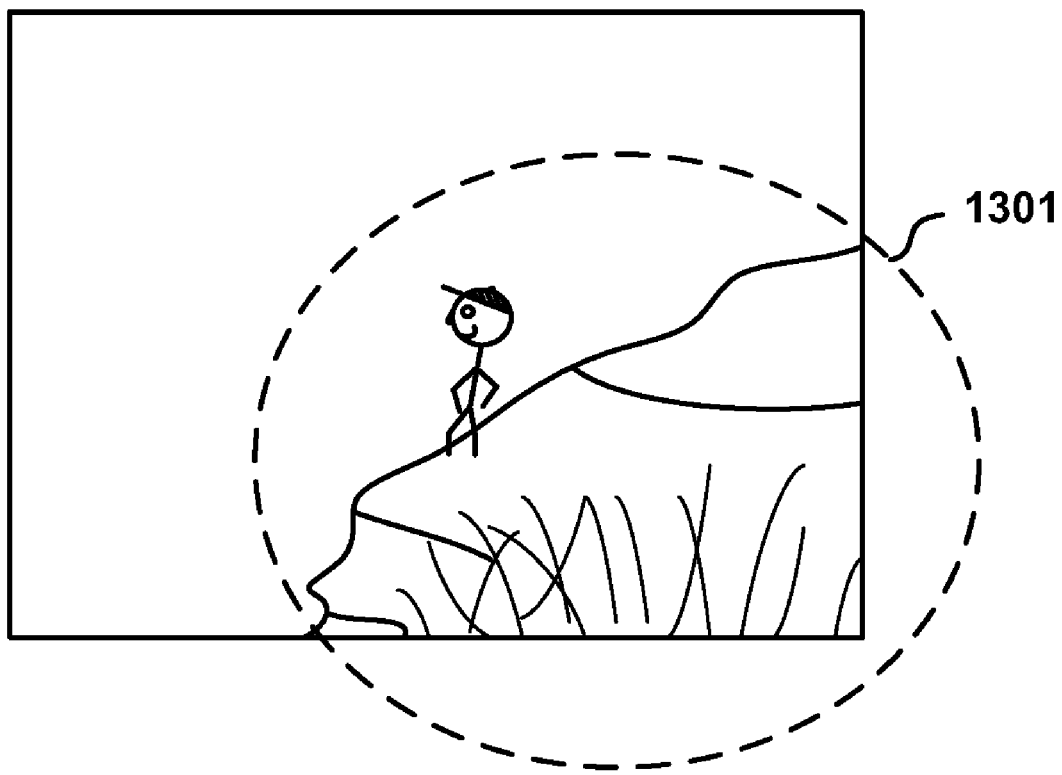
FIG. 15 is an example of a selected layout orientation for presenting the image of FIG. 13, according to one embodiment.

FIG. 15 is an example of a selected layout orientation 1500 for presenting image 1300, according to one embodiment. For example, consider an embodiment of the method of flow diagram 1000 where composition template 500D (FIG. 5D) is used to evaluate image 1300 and determine a selected layout orientation. A variety of layout orientations for image 1300 are evaluated. The composition score for selected layout orientation 1500 will be very close to 1.0 (such as 0.8), which is very high on a scale running from zero to one. Layout orientation 1500 achieves this high image composition score due to region 1301 being enlarged to maximally fill (without extending beyond) area of interest 541 of composition template 500D. In this fashion, selected layout orientation 1500 is selected because it complies with the rule of composition embodied within composition template 500D.

Although the subject matter of the present technology has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of evaluating compositional quality of a layout orientation of an image, said method comprising:

receiving image saliency data for an image to be presented in a viewing region;

receiving a layout orientation for presenting said image in said viewing region;

receiving a composition template embodying an image composition rule, wherein said composition template is a grayscale map and wherein said composition template is not derived from said image;

utilizing said image saliency data, said composition template, and summing values of a plurality of pixels of a weighted saliency distribution to determine a weighted occlusion cost for viewing said image using said layout orientation; and utilizing said weighted occlusion cost to determine a composition score indicating quality of said layout orientation with respect to said image composition rule.

2. The method as recited in claim 1, wherein receiving image saliency data for an image to be presented in a viewing region comprises:

receiving said image saliency data represented in the form of a grayscale map of said image.

3. The method as recited in claim 1, wherein said receiving a composition template embodying an image composition rule comprises:

receiving a saliency map, said saliency map designating an area of visual interest in a viewing region as expressed by said image composition rule.

4. The method as recited in claim 1, wherein said receiving a composition template embodying an image composition rule comprises:

receiving a saliency map wherein a saliency value assigned to an area within said saliency map is weighted to express an importance of visibility of said area according to said image composition rule.

5. The method as recited in claim 1, wherein said receiving a composition template embodying an image composition rule comprises:

receiving said composition template from a library of composition templates.

6. The method as recited in claim 1, wherein said utilizing said image saliency data and said composition template to determine a weighted occlusion cost for said layout orientation comprises:

utilizing said image saliency data and said layout orientation to determine a layout saliency distribution;

utilizing said composition template and said layout saliency distribution to determine said weighted saliency distribution of said image layout; and determining said weighted occlusion cost from said weighted saliency distribution.

7. The method as recited in claim 1, wherein said utilizing said weighted occlusion cost to determine a composition score indicating quality of said layout orientation with respect to said image composition rule comprises:

determining a ratio of said weighted occlusion cost to a summation of visible saliency in a layout saliency distribution of said layout orientation.

8. A computer-readable medium having computer-executable instructions for performing steps of a method for determining a layout orientation for presenting an image within a viewing region, said instructions comprising:

receiving image saliency data for an image to be displayed within a viewing region;

receiving a composition template embodying an image composition rule, wherein said composition template is a grayscale map and wherein said composition template is not derived from said image;

determining a plurality of layout orientations for presenting said image in said viewing region;

utilizing said image saliency data, said composition template, and summing values of a plurality of pixels of a weighted saliency distribution to determine a weighted occlusion cost for viewing said image using a layout orientation of said plurality of layout orientations;

utilizing said weighted occlusion cost to determine a composition score indicating quality of said layout orientation with respect to said image composition rule; and determining a selected layout orientation for presenting said image within said viewing region by comparing composition scores for said plurality of layout orientations.

9. The computer-readable medium of claim 8, wherein said method further comprises computer-executable instructions for:

cropping said image according to dimensions of said selected layout orientation for presenting said image within said viewing region.

10. The computer-readable medium of claim 8, wherein said computer executable instructions for receiving image saliency data for an image to be presented in a viewing region comprise computer-executable instructions for:

receiving said image saliency data represented in the form of a grayscale map of said image.

11. The computer-readable medium of claim 8, wherein said computer executable instructions for receiving a composition template embodying an image composition rule comprise computer-executable instructions for:

receiving a saliency map, said saliency map designating an area of visual interest in said viewing region as expressed by said image composition rule.

12. The computer-readable medium of claim 8, wherein said computer executable instructions for receiving a composition template embodying an image composition rule comprise computer-executable instructions for:

receiving a saliency map wherein a saliency value assigned to an area within said saliency map is weighted to express an importance of visibility of said area according to said image composition rule.

13. The computer-readable medium of claim 8, wherein said computer executable instructions for utilizing said image saliency data and said composition template to determine a weighted occlusion cost for a layout orientation of said plurality of layout orientations comprise computer-executable instructions for:

utilizing a scaled composition template to determine said weighted saliency distribution for a portion of a layout saliency distribution; and determining said weighted occlusion cost from said weighted saliency distribution.

14. The computer-readable medium of claim 8, wherein said computer executable instructions for utilizing said weighted occlusion cost to determine a composition score indicating quality of said layout orientation with respect to said image composition rule comprise computer-executable instructions for:

determining a ratio of said weighted occlusion cost to a summation of visible saliency in a layout saliency distribution of said layout orientation.

15. A method for capturing an image composition rule in a composition template, said method comprising:

presenting a viewing region to a user, wherein said viewing region is presented to said user in a uniform color;

receiving a user designation of an area of visual interest in said viewing region, said area of visual interest representing a user specified image composition rule regarding positioning of a salient image feature with respect to said viewing region;

generating an updated viewing region from said viewing region, said updated viewing region indicating said area of interest with a color other than said uniform color;

saving said updated viewing region as a composition template which embodies said image composition rule, wherein said composition template is a grayscale map and wherein said composition template is not derived from an image;

utilizing an image saliency data, said composition template, and summing values of a plurality of pixels of a weighted saliency distribution to determine a weighted occlusion cost for viewing said image using a layout orientation; and utilizing said weighted occlusion cost to determine a composition score indicating quality of said layout orientation with respect to said image composition rule.

16. The method as recited in claim 15, wherein said presenting a viewing region to a user comprises:

presenting said viewing region as an image comprised of a uniform grayscale color.

17. The method as recited in claim 15, wherein said receiving a user designation of an area of visual interest in said viewing region comprises:

receiving a user designation of a plurality of areas of visual interest in said viewing region.

18. The method as recited in claim 15, wherein said receiving a user designation of an area of visual interest in said viewing region comprises:

receiving a user designation of a plurality of areas of varying levels of visual interest in said viewing region.

19. The method as recited in claim 18, wherein said generating an updated viewing region from said viewing region comprises:

utilizing a plurality of grayscale colors to indicate said plurality of areas of varying levels of visual interest, wherein each level of said varying levels of visual interest is represented by a unique grayscale color.

20. The method as recited in claim 15, wherein said saving said updated viewing region as a composition template which embodies said image composition rule comprises:

saving said composition template as a saliency map for use in evaluating compositional quality of a digital image.

* * * * *